(12) United States Patent
Kim

(10) Patent No.: US 11,720,142 B2
(45) Date of Patent: Aug. 8, 2023

(54) SHEET FOR DISPLAY PANEL

(71) Applicant: SG GLOBAL CO., LTD., Seongnam-si (KR)

(72) Inventor: Ji Woong Kim, Seongnam-si (KR)

(73) Assignee: SG GLOBAL CO., LTD., Seongnam-si (KR)

( * ) Notice: Subject to any disclaimer, the term of this patent is extended or adjusted under 35 U.S.C. 154(b) by 0 days.

(21) Appl. No.: 17/793,777

(22) PCT Filed: Jan. 18, 2021

(86) PCT No.: PCT/KR2021/000644
§ 371 (c)(1),
(2) Date: Jul. 19, 2022

(87) PCT Pub. No.: WO2021/149983
PCT Pub. Date: Jul. 29, 2021

(65) Prior Publication Data
US 2023/0063138 A1    Mar. 2, 2023

(30) Foreign Application Priority Data

Jan. 21, 2020   (KR) ........................ 10-2020-0007747

(51) Int. Cl.
*G09G 5/00*   (2006.01)
*G06F 1/16*   (2006.01)
(Continued)

(52) U.S. Cl.
CPC .......... *G06F 1/1601* (2013.01); *G06F 3/0412* (2013.01); *G09F 9/301* (2013.01);
(Continued)

(58) Field of Classification Search
CPC ...... G06F 1/1601; G06F 3/041; G06F 3/0412; G06F 2200/1634; G06F 2203/04103;
(Continued)

(56) References Cited

U.S. PATENT DOCUMENTS

2005/0142382 A1*  6/2005  Menda .................. H10K 50/844
                                              428/917
2014/0232956 A1*  8/2014  Kwon ................... H01L 27/124
                                              349/12
(Continued)

FOREIGN PATENT DOCUMENTS

KR         10-1164632 B1    7/2012
KR      10-2013-0044628 A    5/2013
(Continued)

OTHER PUBLICATIONS

International Search Report of PCT/KR2021/000644 published on Jul. 29, 2021.
Written opinion of PCT/KR2021/000644 published on Jul. 29, 2021.

*Primary Examiner* — Joe H Cheng

(57) ABSTRACT

A sheet for a display panel according to the present invention comprises: a base substrate which includes a protective member on one surface thereof, is visually transparent, and has a flat shape; a print layer which covers a part of one surface of the base substrate, has a predetermined thickness, and blocks light transmission therethrough; a filling layer which covers both the print layer and the base substrate, has a flat-shaped outer surface, and has visual transparency; and an adhesive member which is visually transparent, covers the outer surface of the filling layer, has an adhesive function, and is adhered to a transparent member forming the appearance of a display panel.

3 Claims, 12 Drawing Sheets

(51) Int. Cl.
*G06F 3/041* (2006.01)
*G09F 9/30* (2006.01)

(52) U.S. Cl.
CPC ............... *G06F 2200/1634* (2013.01); *G06F 2203/04103* (2013.01)

(58) Field of Classification Search
CPC . G09F 9/301; G02F 1/133305; H10K 77/111; B32B 37/12; B32B 2307/412; B32B 2457/20
See application file for complete search history.

(56) References Cited

U.S. PATENT DOCUMENTS

| | | | | |
|---|---|---|---|---|
| 2015/0223359 | A1* | 8/2015 | Kang | ............... H05K 1/14 361/752 |
| 2016/0124565 | A1* | 5/2016 | Kim | ............... G06F 3/0412 345/173 |
| 2016/0139696 | A1* | 5/2016 | Kim | ............... G06F 3/041 345/173 |
| 2017/0324060 | A1* | 11/2017 | Kim | ............... G02B 5/208 |
| 2018/0198089 | A1* | 7/2018 | Kim | ............... H10K 50/844 |

FOREIGN PATENT DOCUMENTS

| | | |
|---|---|---|
| KR | 10-2013-0117101 A | 10/2013 |
| KR | 10-1512185 B1 | 4/2015 |
| KR | 10-2015-0145211 A | 12/2015 |
| KR | 10-2017-0088262 A | 8/2017 |
| KR | 10-2018-0001599 A | 1/2018 |
| KR | 10-1959277 A | 3/2019 |
| KR | 10-2124991 B1 | 6/2020 |

\* cited by examiner

SHEET FOR DISPLAY PANEL

CROSS-REFERENCE TO RELATED APPLICATION

This application is the National Stage of International Application No. PCT/KR2021/000644, filed on Jan. 18, 2021, which claims the benefit of and priority to Korean Patent Application No. 10-2020-0007747 filed on Jan. 21, 2020, which are herein incorporated by reference in its entirety.

TECHNICAL FIELD

The present invention relates to a sheet for a display panel, and specifically, to a sheet for a display panel in which a filling layer is formed on a base substrate on which a print layer is formed to remove a step of the print layer.

The present invention relates to a sheet for a display panel that can be mass-produced in a roll-to-roll method by forming a filling layer in a state in which an adhesive member is not present and that can prevent the adhesive member from being deformed due to heating and pressing.

The present invention relates to a sheet for a display panel that includes an adhesive member for bonding with a transparent member on an outer surface of a filling layer to facilitate a lamination process and that can be attached to a curved surface of the transparent member without air bubbles.

The present invention relates to a sheet for a display panel that is laminated with a transparent member in a state in which a print layer is formed on a base substrate to be able to increase a printing degree of the print layer.

The present invention relates to a sheet for a display panel that prevents bubbles rom occurring by forming a filling layer on a print layer in a planarized state.

BACKGROUND ART

In recent electronic devices such as smartphones using touch sensors and touch modules, a pattern enabling a touch function is formed in an intermediate portion of a film, and electrodes should be connected to transmit or receive electrical signals to or from the pattern.

A touch sensor performs the above touch function and is operated by electrical signals being transmitted and received by collecting electrodes connected to patterns of the touch sensor at an edge portion and connecting terminals.

Referring to FIG. 1, the edge portion is referred to as a bezel, and the bezel is formed through a printing process using black ink or white ink as a layer that blocks visibility from the surface.

That is, the bezel is formed by a method of printing ink on an edge bezel portion of a lower surface of a glass 10 or by a method of attaching a decoration film 14 which is provided with adhesive members on both sides thereof.

However, the method of attaching the decoration film 14 is not suitable because it causes bubbles or stains, and when the bezel is formed by the method of printing, there is a problem in that a step is formed due to a thickness of the bezel.

Accordingly, Korean Patent Laid-Open Application No. 10-2017-0088262 discloses a structure of a cover glass window for a display panel, which solves a step problem by providing an adhesive part 18 formed by applying a pressure-sensitive material and/or an adhesive material on both sides of the a poly(ethylene terephthalate) (PET) film as shown in FIG. 2.

However, in order to prevent a gap from occurring, a thick material with a predetermined thickness is applied as an adhesive material such as an optical clear adhesive (OCA) or the like used to remove the step. In a heating and pressing process for attaching the thick material, stains and bubbles occur due to soft OCA or a printed bezel is deformed.

That is, since the adhesive material such as OCA or the like follows a step caused due to printing and has poor step followability of being able to fill every corner, the above problem is caused by using a thicker adhesive material and allowing the step to be filled using stronger heat and pressure.

Accordingly, as shown in FIG. 3, Korean Patent Laid-Open Application No. 10-2018-0001599 discloses a double-sided pressure-sensitive adhesive sheet for an image display device in which a double-sided adhesive sheet 1 formed to match a surface shape of a bonding surface 1a, which is bonded to a surface to be attached, is provided and attached below a surface protection panel 2 on which a step difference 2b is formed so that it has good dimensional accuracy and excellent mass-productivity.

However, in consideration of a thickness of the step 2b, the double-sided adhesive sheet 1 can be expected to increase step followability, but there is a disadvantage in that the double-sided adhesive sheet 1 itself should be produced exclusively, and it is difficult to apply the double-sided adhesive sheet 1 to a device with a curved display.

Accordingly, as shown in FIG. 4, Korean Patent Registration No. 10-1959277 discloses a transparent member applied to a curved display device configured with a print layer 15 formed on a curved surface of a transparent substrate 16 first and an adhesive layer 14 bonded to lower surfaces of the print layer 15 and the transparent substrate 16.

However, in the above structure, OCA having a thickness of 150 μm or more is used to remove a step of the print layer 15. Even when the removal is performed using the thick OCA, there are problems in that steps in corners of the print layer 15 are not removed and defects such as air bubbles occur.

In addition, as bezel widths have narrowed in recent electronic devices, there are limitations in forming the print layer 15 by a stamp method.

Accordingly, as shown in FIG. 5, Korean Patent Registration No. 10-1512185 discloses a panel having a display function and provided with a filling layer 150 for removing a step caused due to a thickness of a print layer 130.

However, in the related art, since the filling layer 150 is formed in a state in which the print layer 130 is formed on an upper surface of an adhesive member 120 which is soft and has slight elasticity, there is a problem in that defects such as marks and stains occur due to a pressure of a roller, which is applied when the filling layer 150 is formed, and in drying, the adhesive member 120 contracts and expands, which degrades printing accuracy.

In addition, in order to form the filling layer 150, the adhesive member 120 on which the print layer 130 is formed is transferred, and a release paper attached to a lower side of the adhesive member 120 is peeled off, which generates bubbles or an adhesive force that attaches it to printing equipment and may cause defects.

Therefore, since roll-to-roll production is impossible, there is a problem in that productivity is degraded.

In addition, when the filling layer 150 is formed by heating and pressing in a state in which the adhesive member 120 is attached, there is a problem in that physical properties of the adhesive member 120 change and transparency is degraded.

SUMMARY OF THE INVENTION

Technical Problem

The present invention is directed to providing a sheet for a display panel in which a filling layer is formed on a base substrate on which a print layer is formed to remove a step of the print layer.

The present invention is also directed to providing a sheet for a display panel that can be mass-produced in a roll-to-roll method by forming a filling layer in a state in which an adhesive member is not present and that can prevent the adhesive member from being deformed due to heating and pressing.

The present invention is also directed to providing a sheet for a display panel that includes an adhesive member for bonding with a transparent member on an outer surface of a destination and a filling layer for facilitating a lamination process and that can be attached to a curved surface of the transparent member without air bubbles.

The present invention is also directed to providing a sheet for a display panel laminated with a transparent member in a state in which a print layer is formed on a base substrate to be able to increase a printing degree of the print layer.

The present invention is also directed to providing a sheet for a display panel that prevents bubbles from occurring by forming a filling layer on a print layer in a planarized state.

Technical Solution

One aspect of the present invention provides a sheet for a display panel, which includes a protective member which is provided with a protective member on one surface thereof, is transparent, and has a flat shape, a print layer configured to cover a portion of one surface of the base substrate to have a predetermined thickness and block light transmission, a filling layer configured to cover both of the print layer and the base substrate and have an outer surface formed to be flat and transparent, and an adhesive member which is transparent, covers the outer surface of the filling layer with an adhesive function, and is bonded to a transparent member forming an exterior of a display panel.

The filling layer may be made of an ultraviolet (UV) curable material and may remove a step due to a height difference between the base substrate and the print layer.

The print layer may be provided on an edge of the base substrate and may be formed by printing.

A foreign material blocking member may be provided on an outer surface of the adhesive member to prevent foreign materials from coming into contact with the adhesive member, and an adhesive strength between the base substrate and the protective member may be greater than an adhesive strength between the adhesive member and the foreign material blocking member.

The print layer, the filling layer, and the adhesive member may be formed in a roll-to-roll method in which the base substrate is sequentially stacked while the base substrate is continuously transferred.

Advantageous Effects

According to the present invention, because a filling layer is formed on a base substrate on which a print layer is formed, there is an effect of being able to remove a step of the print layer.

In addition, according to the present invention, the filling layer is formed in a state in which an adhesive member is not present so that mass production is possible in a roll-to-roll method, and since deformation of the adhesive member due to heating and pressing can be prevented, degradation of visibility due to air bubbles or wrinkles can be prevented.

In addition, there is an advantage in that an adhesive member for bonding with a transparent member can be provided on an outer surface of the filling layer to facilitate a lamination process and can be attached to a curved surface of the transparent member without air bubbles.

In addition, it is possible to increase printing accuracy of the print layer by laminating the base substrate with the transparent member in a state in which the print layer is formed on the base substrate.

In addition, the filling layer is formed on the print layer in a flat state so that there is an advantage of preventing air bubbles from occurring.

DETAILED DESCRIPTION OF THE INVENTION

Modes of the Invention

Hereinafter, a configuration of a sheet 100 for a display panel according to the present invention will be described with reference to the accompanying FIGS. 6 and 7.

Figure 1:
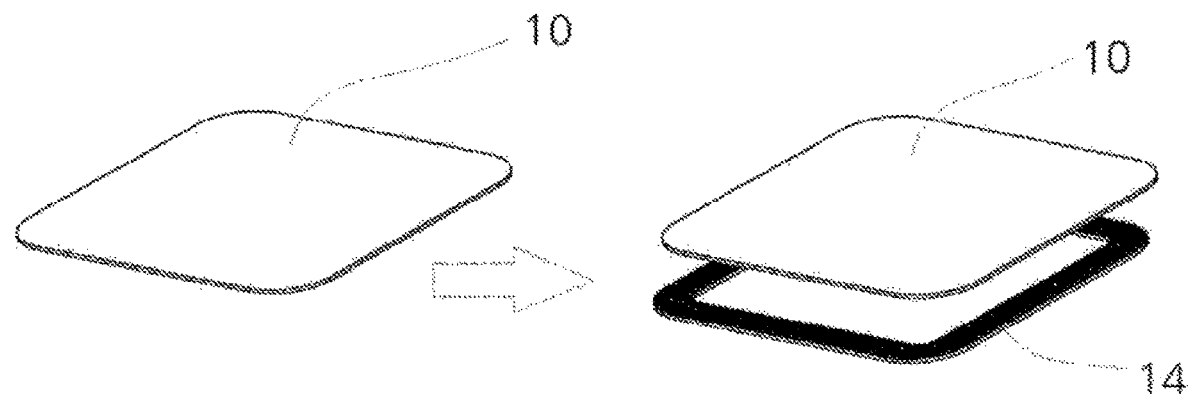
FIG. 1 is a schematic diagram for describing a step formed in a conventional decorative film.
Figure 2:
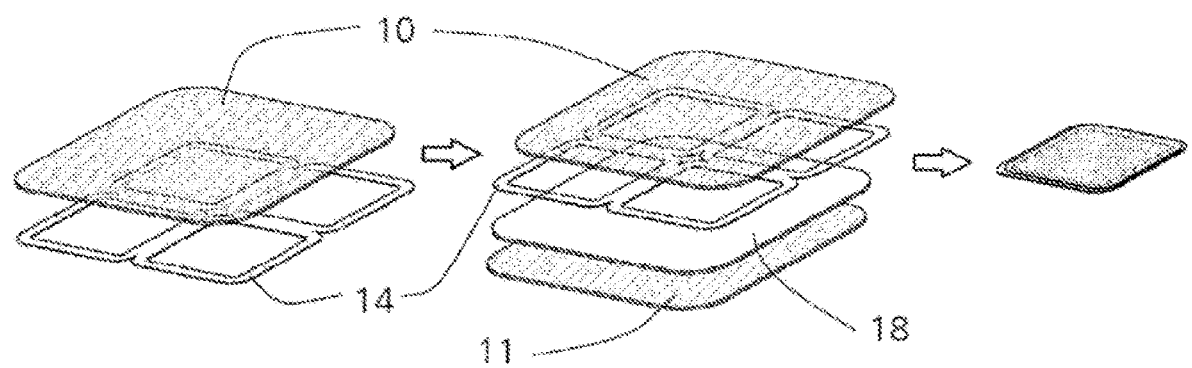
FIG. 2 is a perspective view illustrating a structure of a cover glass window for a display panel disclosed in Korean Patent Laid-Open Application No. 10-2017-0088262.
Figure 3:
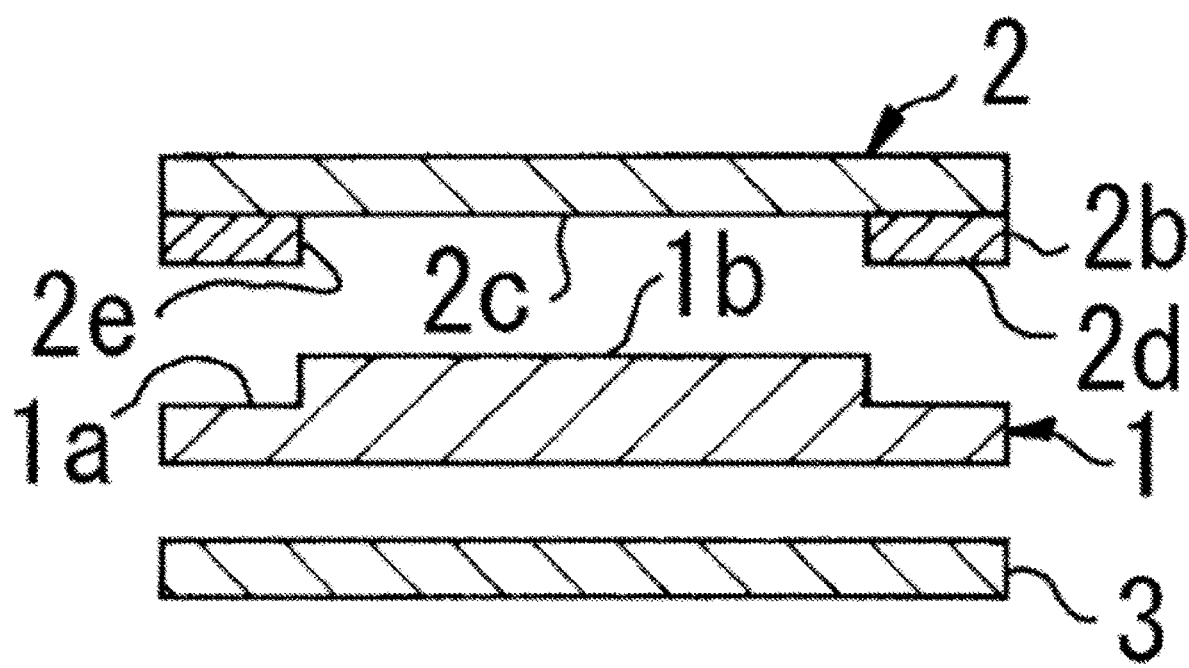
FIG. 3 is a cross-sectional view illustrating a double-sided pressure-sensitive adhesive sheet for an image display device disclosed in Korean Patent Laid-Open Application No. 10-2018-0001599.
Figure 4:
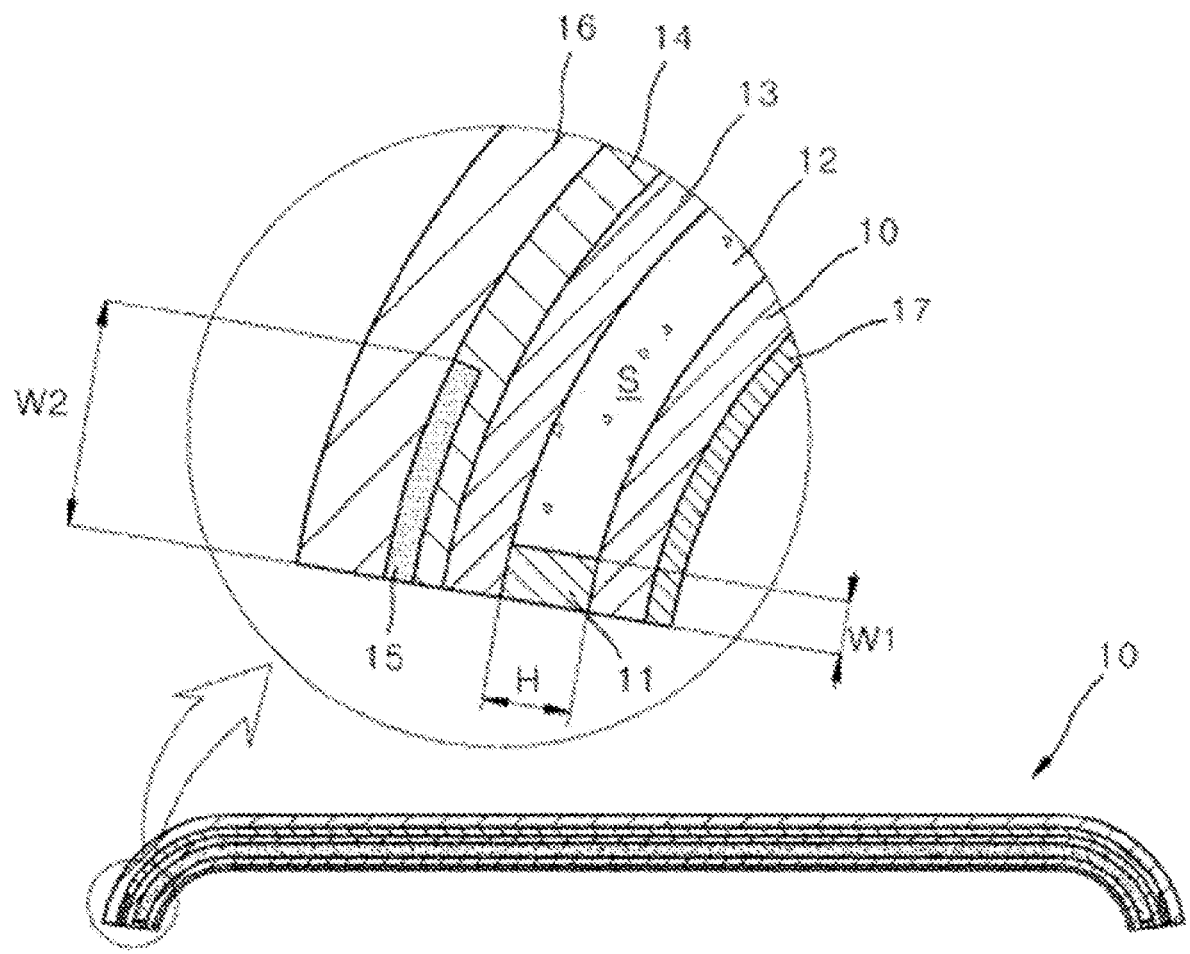
FIG. 4 is a cross-sectional view illustrating a structure of a transparent member applied to a curved display device disclosed in Korean Patent Registration No. 10-1959277.
Figure 5:
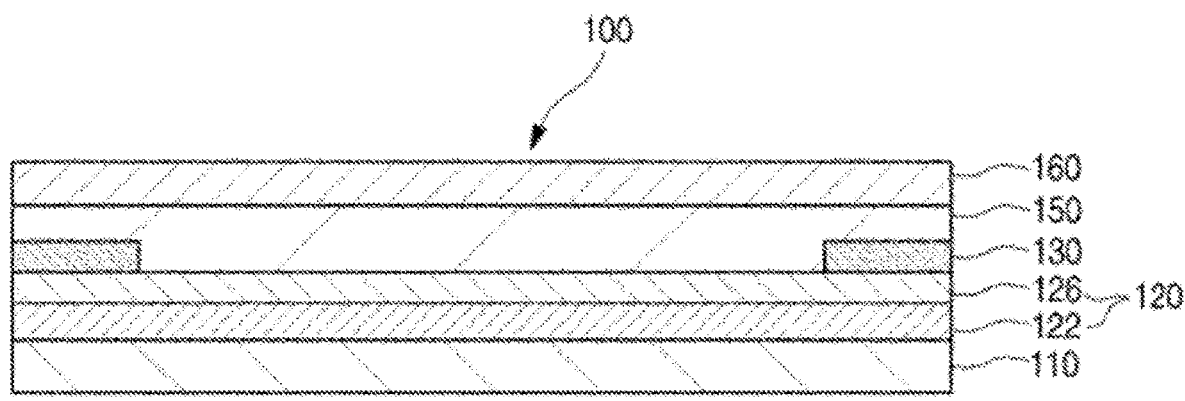
FIG. 5 is a cross-sectional view illustrating a panel having a display function disclosed in Korean Patent Registration No. 10-1512185.
Figure 6:
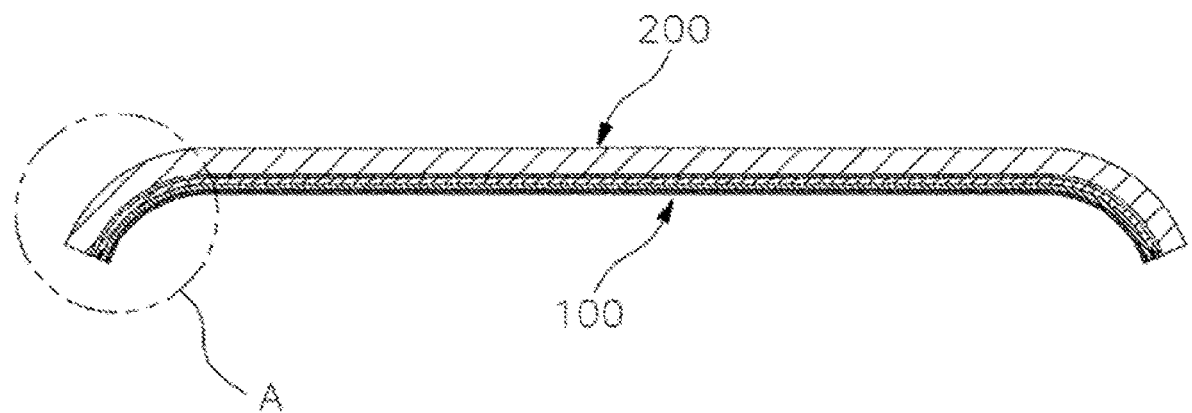
FIG. 6 is a longitudinal cross-sectional view illustrating a structure of a sheet for a display panel according to the present invention.
Figure 7:
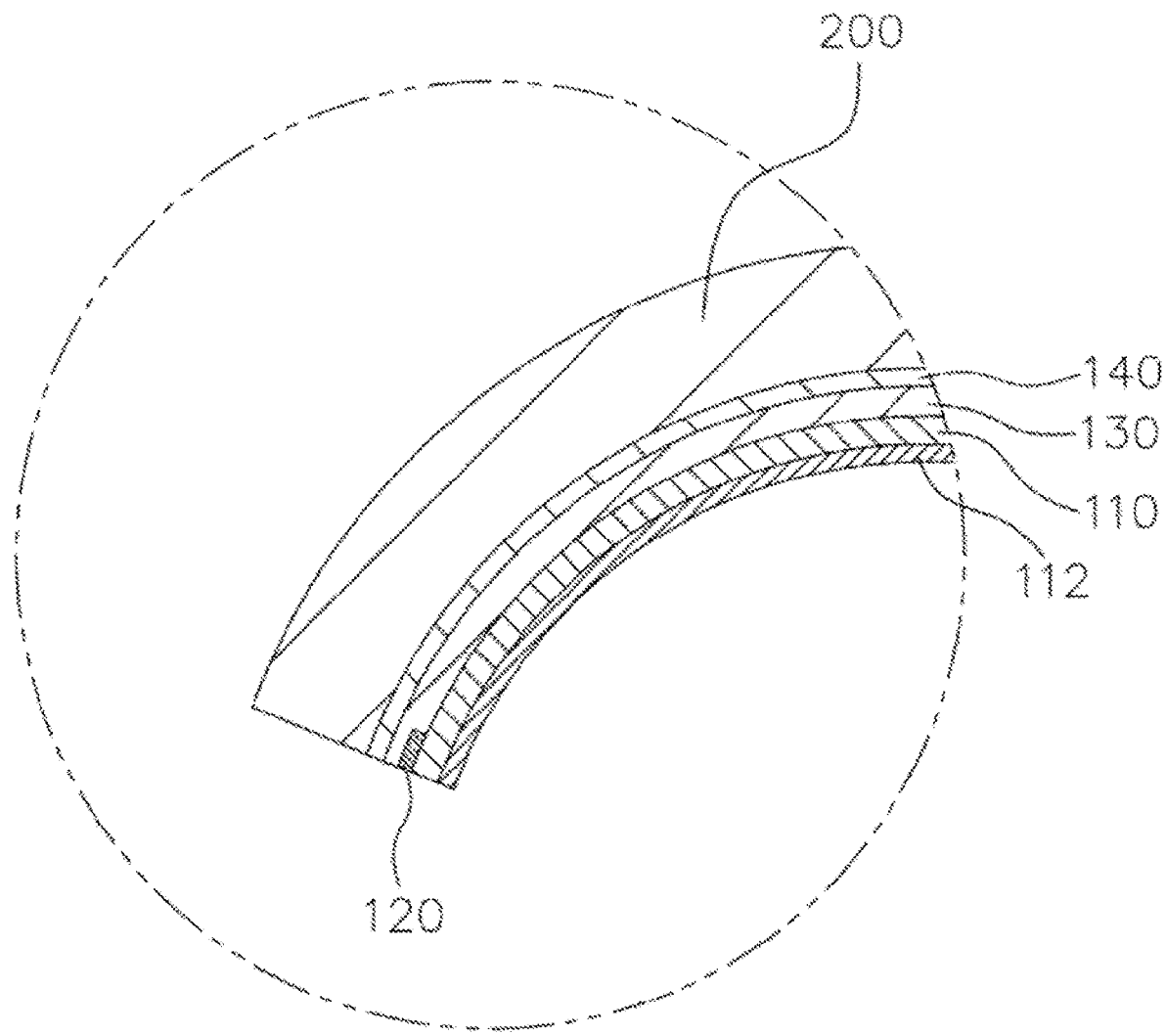
FIG. 7 is an enlarged cross-sectional view illustrating part "A" of FIG. 6 showing a detailed structure of the sheet for a display panel according to the present invention.

FIG. 6 is a longitudinal cross-sectional view illustrating a structure of the sheet 100 for a display panel according to the present invention, and FIG. 7 is an enlarged cross-sectional view illustrating part "A" of FIG. 6 showing a detailed structure of the sheet 100 for a display panel according to the present invention.

Before describing the present invention, it should be noted that terms or words used herein and in the appended claims should not be construed according to ordinary dictionary meanings, but should be construed in accordance with meanings and concepts consistent with the technical spirit of the present invention according to the principle that inventors can properly define concepts of terms in order to describe their inventions in the best manner.

Therefore, the embodiments described herein and the configurations shown in the drawings are merely as exemplary embodiment of the present invention and do not represent all the technical spirit of the present invention, and it should be understood that there may be various equivalents and modifications capable of substituting for the embodiments and the configurations at the time of filing the present application.

First, as shown in FIG. 6, the sheet 100 for a display panel according to the present invention is attached to an inner surface of a transparent member 200 forming, an exterior of an electronic device, and a print layer 120 is provided, at an edge of the sheet 100 for a display panel to form a bezel, thereby blocking light of a light emission body located below from being transmitted upward.

In addition, since the sheet 100 for a display panel is able to easily form the bezel by being directly attached to the transparent member 200 in a state in which the print layer 120 is formed, printing in a stamp method is not necessary on a lower surface of the transparent member 200, and it is possible to form the print layer 120 with a narrow width and high precision.

In addition, since the print layer 120 is embedded in the sheet 100 for a display panel, deformation or heaving does not occur during a process of attaching the sheet 100 for a display panel to the transparent member 200.

To describe the sheet 100 for a display panel in detail with reference to FIG. 7, the sheet 100 for a display panel includes a base substrate 110 to which a protective member 112 is attached, a print layer 120 configured to cover a portion of one surface of the base substrate 110 to have predetermined thickness and block light transmission, a filling layer 130 configured to cover both of the print layer 120 and the base substrate 110 and have a flat outer surface and transparency, and an adhesive member 140 which is transparent, covers the outer surface of the filling layer 130 with an adhesive function, and is bonded to the transparent member 200.

The base substrate 110 is made of a flexible and transparent material, and in the present invention, a polyethylene terephthalate (PET) film is employed as the base substrate 110, and various other materials can be applied as long as they are flexible and transparent.

The protective member 112 is attached to a lower surface of the base substrate 110. When the print layer 120, the filling layer 130, and the adhesive member 140 are formed while the base substrate 110 is transferred in a roll-to-roll manner, the protective member 112 is a component for preventing scratches from occurring and preventing foreign materials from coming into contact with the lower surface of the base substrate 110.

Therefore, the protective member 112 may be formed to maintain a firmly attached state so as not to be peeled off from the base substrate 110 due to friction resulting from a conveyor belt and the like and may be formed to be separated from the base substrate 110 when an external force is applied, as necessary.

The print layer 120 is formed on an edge of an upper surface of the base substrate 110. The print layer 120 is formed only on a portion of the edge of the base substrate 110 by screen printing, roll-to-roll printing, gravure printing, offset printing, or digital printing to perform a bezel function, and since the print layer 120 is printed on the flat base substrate 110, the print layer 120 may be precisely formed to have a very narrow width.

Alternatively, in the case of a range where light does not pass, the print layer 120 may be formed such that white ink or blue ink instead of black ink is printed multiple times and laminated, or a black print layer 120 is formed on a lower side and a red print layer 120 is formed on the black print layer 120 so that when viewed downward from the transparent member 200, the red bezel is visually identified and light emitted from below is blocked.

The filling layer 130 is provided above the print layer 120. The filling layer 130 is formed to have a predetermined thickness with an ultraviolet (UV) curable material, covers both of the print layer 120 and the base substrate 110, and has a flat outer surface and transparency.

In addition, the filling layer 130 removes a step due to a height difference between the base substrate 110 and the print layer 120 to block air bubbles from occurring, thereby being able to block light emitted from a light emission body from leaking.

In addition, the filling layer 130 may prevent disorder or deformation of the print layer 120 and also performs a function of preventing contamination of the print layer 120.

Therefore, even when the sheet 100 for a display panel is attached to the curved portion of the transparent member 200 as shown in FIG. 6, the print layer 120 maintains a predetermined shape without heaving, deformation, or distortion so that a bezel with a narrow width may be formed.

The adhesive member 140 is provided on an upper surface of the filling layer 130. In the present invention, OCA is employed as the adhesive member 140, and before being bonded to the transparent member 200, the adhesive member 140 may be prevented from being exposed by a foreign material blocking member 150 (see FIG. 11) to block contact with foreign materials.

Hereinafter, a process of manufacturing the sheet 100 for a display panel configured as described above will be described with reference to the accompanying FIGS. 8 to 12.

Figure 8:
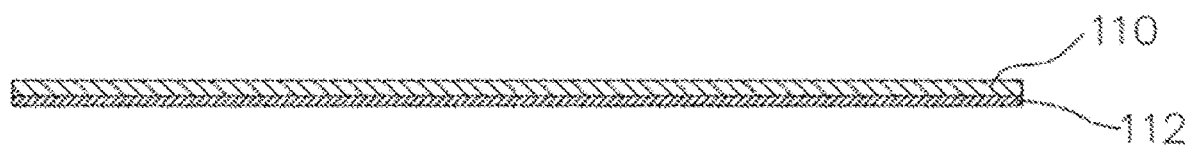
FIG. 8 is a longitudinal cross-sectional view illustrating a structure of a base substrate which is one component of the sheet for a display panel according to the present invention.
Figure 9:
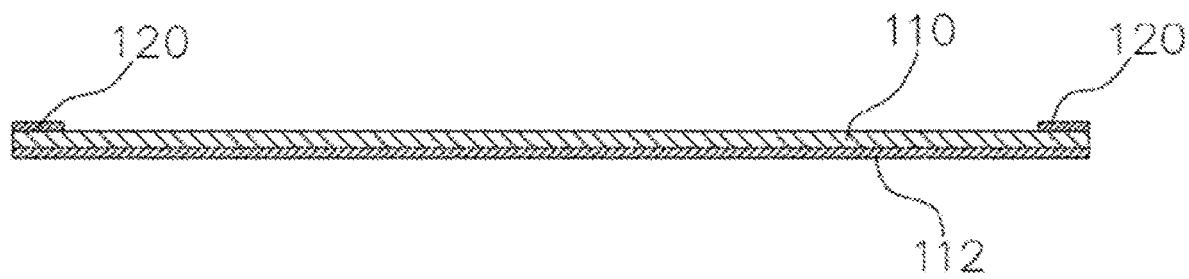
FIG. 9 is a longitudinal cross-sectional view illustrating a state in which a print layer is formed on the base substrate which is one component of the sheet for a display panel according to the present invention.
Figure 10:
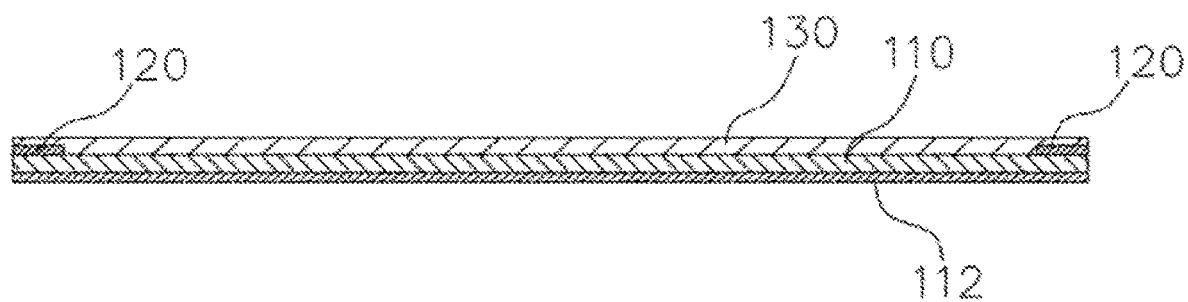
FIG. 10 is a longitudinal cross-sectional view illustrating a state in which a filling layer is formed on an outer side of the print layer which is one component in the sheet for a display panel according to the present invention.

FIG. 8 is a longitudinal cross-sectional view illustrating a structure of the base substrate 110 which is one component of the sheet 100 for a display panel according to the present invention. FIG. 9 is a longitudinal cross-sectional view illustrating a state in which the print layer 120 is formed on the base substrate 110 which is one component of the sheet 100 for a display panel according to the present invention, and FIG. 10 is a longitudinal cross-sectional view illustrating a state in which the filling layer 130 is formed on an outer side of the print layer 120 which is one component in the sheet 100 for a display panel according to the present invention.

Figure 11:
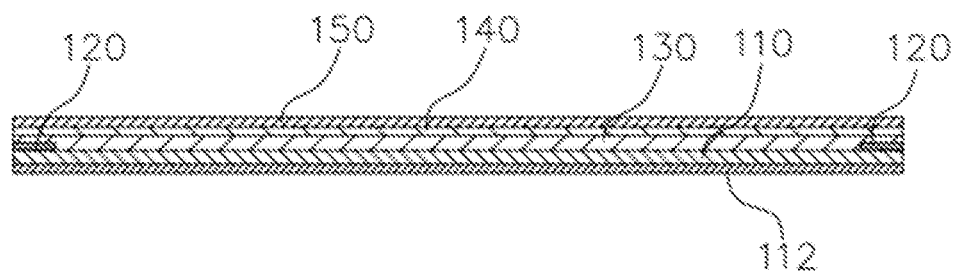
FIG. 11 is a longitudinal cross-sectional view illustrating the structure of a sheet for a display panel according to the present invention.
Figure 12:
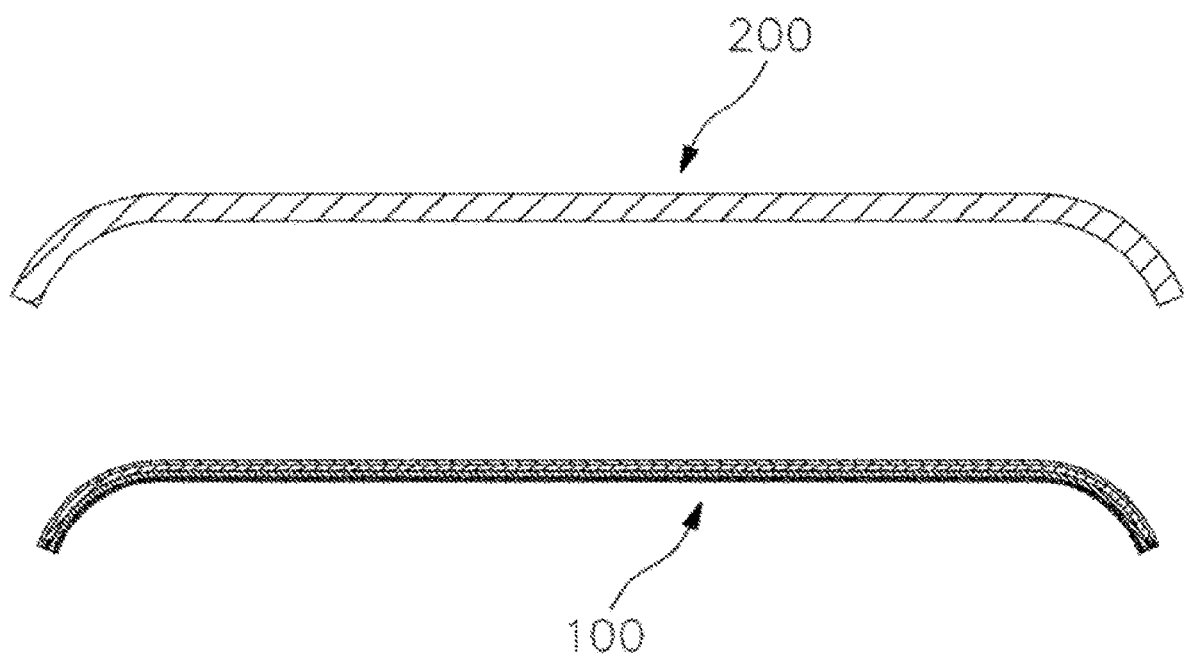
FIG. 12 is a longitudinal cross-sectional view illustrating the sheet for a display panel according to the present invention before being bonded to the transparent member.

In addition, FIG. 11 is a longitudinal cross-sectional view illustrating a structure of the sheet 100 for a display panel according to the present invention, and FIG. 12 is a longitudinal cross-sectional view illustrating the sheet 100 for a display panel according to the present invention before being bonded to the transparent member 200.

First, as shown in FIG. 8, the base substrate 110 in a flat state is prepared. The base substrate 110 is in a state in which the protective member 112 is bonded to a lower surface thereof, may be applied in the form of a sheet, and may be prepared in a continuous transfer method such as a roll-to-roll manner.

Thereafter, as shown in FIG. 9, the print layer 120 is formed on an edge of an upper surface of the base substrate 110. As described above, the print layer 120 performs a bezel function on the display panel, may be expressed in various colors, and may be formed precisely and narrowly by applying a digital printing method.

The print layer 120 protrudes upward from the upper surface of the base substrate 110 to have a step. Accordingly, as shown in FIG. 10, the filling layer 130 is formed above the print layer 120 and the base substrate 110.

The filling layer 130 is formed to remove the step between the print layer 120 and the base substrate 110 and have a flat upper surface, and a transparent UV curable material may be applied as the filling layer 130.

As shown in FIG. 11, the adhesive member 140 is stacked on the upper surface of the filling layer 130. OCA is applied to the adhesive member 140, and the foreign material blocking member 150 is bonded to an upper side to prevent the adhesive member 140 from being in contact with foreign materials.

The manufacture of the sheet 100 for a display panel is completed according to the above processes, and adhesion strength between the foreign material blocking member 150 and the adhesive member 140 is designed to be smaller than adhesion strength between the base substrate 110 and the protective member 112. Thus, the protective member 112 is not peeled off from the base substrate 110 due to friction or interference, which may occur during the manufacturing process, between the protective member 112 and another object.

Meanwhile, as shown in FIG. 12, the sheet 100 for a display panel may be attached to the transparent member 200 with a curvature at an edge thereof.

In this case, while seated on a jig with a curvature, the sheet 100 for a display panel is laminated by forming a vacuum atmosphere so that, after being formed to have a curvature as shown in FIG. 12, the foreign material blocking member 150 may be removed and bonded to the transparent member 200.

In this case, in a state in which the print layer 120 is embedded in the sheet 100 for a display panel, the sheet 100 for a display panel is laminated on the transparent member 200 and then realizes a flat surface with the same material without a step on a rear surface due to printing.

Therefore, when a touch panel and a liquid crystal of a display are attached in a post-process, thin OCA and an optically clear resin (OCR) are used so that it is possible to completely prevent bubbles from occurring and to significantly reduce a defect rate during an assembly process of an expensive active-mode organic light-emitting diode (AMO-LED) liquid crystal.

The scope of the present invention is not limited to the above exemplary embodiments, and many other modifications based on the present invention will be possible for those skilled in the art within the above technical scope of the present invention.

For example, in the embodiments of the present invention, although the print layer 120 has been described as being expressed in a single color such as black, white, blue, or red, when the single color falls within a range in which light of the light emission body is blocked, it is possible to express a pattern, a metal texture, and the like from a front side.

In addition, in the embodiments of the present invention, although the base substrate 110 is shown as a single layer and a film is applied to the base substrate 110, various modifications can be achieved as long as the base substrate 110 is transparent and falls within a printable range.

INDUSTRIAL APPLICABILITY

According to a sheet for a display panel according to the present invention, a filling layer can be formed on a base substrate on which a print layer is formed to remove a step of the print layer, mass production is possible in a roll-to-roll method by forming the filling layer in a state in which an adhesive member is not present, and an adhesive member for bonding with a transparent member can be provided on an outer surface of the filling layer to facilitate a lamination process and can be bonded to a curved surface of the transparent member without air bubbles, and thus the present invention has high industrial applicability.

What is claimed is:

1. A sheet for a display panel, comprising:
a base substrate which is flexible and visible and has a flat shape;
a protective member bonded to a lower surface of the base substrate and configured to prevent scratches from occurring on the base substrate and foreign materials from coming in contact during transfer;
a print layer formed to have a predetermined thickness on an edge of an upper surface of the base substrate in a printing method and configured to perform a bezel function by blocking light transmission;
a filling layer configured to cover both of the print layer and the base substrate and have an outer surface formed to be flat and transparent;
an adhesive member which is transparent, covers the outer surface of the filling layer to have an adhesive function, and is bonded to a transparent member forming an exterior of a display panel; and
a foreign material blocking member configured to prevent foreign materials from coming into contact with the adhesive member on an outer surface thereof,
wherein the filling layer is formed prior to the adhesive member, and adhesive strength between the base substrate and the protective member is greater than adhesive strength between the adhesive member and the foreign material blocking member.

2. The sheet of claim 1, wherein the filling layer is made of an ultraviolet (UV) curable material and removes a step due to a height difference between the base substrate and the print layer.

3. The sheet of claim 2, wherein the print layer, the filling layer, and the adhesive member are formed in a roll-to-roll method in which the base substrate is sequentially stacked while the base substrate is continuously transferred.

* * * * *